Patented Dec. 26, 1933

1,941,129

UNITED STATES PATENT OFFICE 1,941,129

TIPPED LACE

Carl A. Matson, Danvers, Mass., assignor, by mesne assignments, to Shoe Lace Company, Boston, Mass., a corporation of Maine No Drawing. Application February 1, 1929
Serial No. 336,916

7 Claims. (Cl. 24—143)

This invention relates to improvements in tipped laces.

The invention is disclosed herein with reference to the manufacture of laces having so-called fabric tips, that is, tips consisting of moldable material applied to the lacing and molded to tip form by suitable dies. These tips can be applied to laces by such machines, for example, as that disclosed in Letters Patent of the United States No. 1,594,971, granted August 3, 1926, on an application filed in the name of the present inventor.

It is an object of my invention to provide shoe or other laces having improved tips of the type mentioned above.

As herein disclosed, the lace tips of my invention are molded with the aid of a novel composition of matter, comprising a solution containing cellulosic and resinous material dissolved in a volatile solvent. In the manufacture of these tips the solution is applied to a portion of the lacing, the portion of the lacing to which the solution has been applied being then treated to evaporate the solvent and to bring the cellulosic and resinous material to moldable condition and then molded to form a lace tip thereon.

With the above and other objects in view the invention will now be described and claimed.

In practicing the invention, I mix a solution of cellulosic material (such as celluloid or nitrocellulose) and a solution of resinous material, applying this liquid material to the portion of the lacing which is to comprise the tip, then heat that portion of the lacing to drive off the solvents and to bring the cellulosic and resinous material to a moldable condition, and finally mold the portion of the lacing to which the composition has been applied, using dies, preferably cold, of suitable form.

According to one formula which I have developed, the cellulosic solution consists of celluloid (or, if preferred, nitro-cellulose) dissolved in a suitable solvent, such as a mixture of equal parts of acetone and denatured alcohol, in the proportions of three-quarters of a pound to a pound of celluloid per gallon of solvent. The resinous solution consists of a solution of shellac dissolved in denatured alcohol, preferably about five pounds of shellac per gallon of solvent. The two solutions just described may be mixed in equal proportions, though the proportions in which the two are mixed can be varied to a considerable extent. The mixture resulting from mixing the two solutions in equal proportions will contain about two and a half pounds of shellac and half a pound or somewhat less of celluloid per gallon of solvent.

Another composition which I have developed for lace tipping consists of the following:

| | Per cent |
|---|---|
| Celluloid | 10 |
| Shellac | 20 |
| Ethyl acetate | 25 |
| Denatured alcohol | 45 |

The celluloid is cut (i. e. dissolved) in the ethyl acetate and the shellac in the alcohol. The two are then mixed.

According to still another formula I make up a nitro-cellulose solution containing three-quarters of a pound to a pound of nitro-cellulose per gallon of a solvent consisting of

| | Per cent |
|---|---|
| Denatured alcohol | 60 |
| Acetone | 2–5 |
| Ethyl acetate | 8–10 |
| Benzol (or a benzol derivative such as xylol or toluol) or bus naptha | 25–30 |

The alcohol, acetone and ethyl acetate are first mixed and the nitro-cellulose dissolved in that mixture after which the benzol, xylol, toluol or bus naptha, which serves as a diluent, is added. With this is used a shellac solution consisting of 34% shellac, 6% Manila copal, and 60% denatured alcohol. This shellac solution will contain about four and a half to five pounds of shellac to the gallon. I mix these solutions in the proportion of one part of the nitro-cellulose solution to about three parts of the shellac solution. It will be understood, however, that the proportions in which the two solutions are mixed may be varied to a considerable extent.

Coloring matter may be added as desired to the mixtures described above. A small amount of nigrosin is satisfactory if black tips are to be made. Zinc oxide with a little bluing may be added for white tips. The natural brown of the shellac either with or without the addition of a small amount of brown pigment, according to the shade required, is suitable for brown tips. Other colors may be used, of course, if desired.

In order to toughen and strengthen the lace tips, a plasticizer, for example, 5% of castor oil, may be added to any of the above described shellac-celluloid or shellac-nitro-cellulose solutions.

The above solutions are applied to the portions of the lacing which are to form tips and these portions of the lacing are then treated to drive off the solvent and to bring the cellulosic and resinous material to a moldable condition. This may be done by heating the portion of the lacing to which the tipping composition has been applied to a temperature of from 750 to 800 degrees Fahrenheit for a period of about half a minute. This evaporates the solvent and brings the tipping material to a moldable condition. A higher temperature than about 800 degrees Fahrenheit should be avoided as there is danger that the lacing material will be scorched, and even that temperature cannot be safely applied for an extended period of time. If a temperature of less than about 750 degrees Fahrenheit is used, the heat-treatment must be continued for a longer time.

The tips should be molded immediately after the heating, before the material has time to harden, in dies, preferably cold, of a form complemental to the desired form of the lacing tips. If desired, a small amount of "Bakelite Lacquer" ("Bakelite" being the name applied to a group of well-known condensation products of phenol and formaldehyde or their homologs), for example, about 10 per cent, may be added to the mixture of cellulosic and resinous solutions. This adds to the water resisting qualities of the lacing tips produced but, of course, increases the cost of the mixture.

The use of cold dies in operating in the manner described above is particularly advantageous in that it avoids the gumming up and fouling of the dies which takes place if hot dies are used to mold materials of this nature. In using cold dies under these conditions satisfactory results will be obtained if the lacing tips remain in the dies for about four seconds.

While, as already stated, the invention may be carried out advantageously with the aid of the machine disclosed in Letters Patent of the United States No. 1,594,971 it should be understood that the invention is in no way limited to use with the aid of a machine of this character. Obviously, it may be carried out in other ways.

Having described my invention what I claim as new and desire to secure by Letters Patent of the United States is:

1. As an article of manufacture, a lace having a tip formed of an end portion of the lace impregnated with cellulosic material and resin.

2. As an article of manufacture, a lace having a tip formed of an end portion of the lace impregnated with cellulosic material and shellac.

3. As an article of manufacture, a lace having a tip formed of an end portion of the lace impregnated with cellulosic material, resin and a plasticizer.

4. As an article of manufacture, a lace having a tip formed of an end portion of the lace impregnated with celluloid, shellac and castor oil.

5. As an article of manufacture, a lace having a tip formed of an end portion of the lace impregnated with cellulosic material, resin and "Bakelite".

6. As an article of manufacture, a lace having a tip formed of an end portion of the lace impregnated with cellulosic material and resin, the proportion of resin being several times that of the cellulosic material.

7. As an article of manufacture, a lace having a tip formed of an impregnated end portion of the lace, the impregnating agent consisting of a celluloid solution containing a hard resin soluble in the solvent employed.

CARL A. MATSON.